(12) United States Patent
Li et al.

(10) Patent No.: US 11,893,073 B2
(45) Date of Patent: Feb. 6, 2024

(54) METHOD AND APPARATUS FOR DISPLAYING MAP POINTS OF INTEREST, AND ELECTRONIC DEVICE

(71) Applicant: Beijing Baidu Netcom Science Technology Co., Ltd., Beijing (CN)

(72) Inventors: Yanyan Li, Beijing (CN); Airong Jiang, Beijing (CN); Shilin Wu, Beijing (CN); Dejing Dou, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 80 days.

(21) Appl. No.: 17/729,282

(22) Filed: Apr. 26, 2022

(65) Prior Publication Data

US 2023/0004614 A1 Jan. 5, 2023

(30) Foreign Application Priority Data

Jun. 30, 2021 (CN) .......................... 202110736043.6

(51) Int. Cl.
*G06F 16/00* (2019.01)
*G06F 16/9538* (2019.01)
(Continued)

(52) U.S. Cl.
CPC .......... *G06F 16/9538* (2019.01); *G06F 16/29* (2019.01); *G06F 16/9537* (2019.01); *G06N 20/00* (2019.01)

(58) Field of Classification Search
CPC ... G06F 16/9538; G06F 16/29; G06F 16/9537
See application file for complete search history.

(56) References Cited

U.S. PATENT DOCUMENTS 11,525,692 B2* 12/2022 Fujimori ............ G01C 21/3679
2009/0055087 A1* 2/2009 Beacher ................ G01C 21/36
701/532

(Continued)

FOREIGN PATENT DOCUMENTS

CN 111651688 A 9/2020
CN 112612957 A 4/2021

OTHER PUBLICATIONS

First Office Action issued by the Chinese Patent Office for Chinese Patent Application No. 202110736043.6, dated Aug. 15, 2023.

(Continued)

*Primary Examiner* — Noosha Arjomandi
(74) *Attorney, Agent, or Firm* — Moore & Van Allen PLLC; Henry B. Ward, III

(57) ABSTRACT

The present disclosure discloses a method and apparatus for displaying map points of interest, and an electronic device, relates to the field of artificial intelligence, and in particular to intelligent transportation. A specific implementation solution includes: acquiring features corresponding to multiple candidate points of interest; determining predicted popularity of the multiple candidate points of interest according to a mapping relation between each feature and each popularity and the features of the multiple candidate points of interest, and the mapping relation is determined based on the frequency of operations performed by a user for each sample point of interest in a historical time period; and displaying the candidate points of interest of which predicted popularity meets a preset popularity condition in a map. Therefore, the accuracy of the displayed points of interest may be enhanced.

17 Claims, 3 Drawing Sheets

(51) Int. Cl.
*G06N 20/00* (2019.01)
*G06F 16/9537* (2019.01)
*G06F 16/29* (2019.01)

(56) References Cited

U.S. PATENT DOCUMENTS

| | | | |
|---|---|---|---|
| 2013/0321466 A1* | 12/2013 | Kocienda | G01C 21/3682 |
| | | | 345/635 |
| 2015/0187107 A1* | 7/2015 | Vander Mey | G06Q 50/01 |
| | | | 345/629 |
| 2021/0063182 A1* | 3/2021 | Williams | G01C 21/3679 |
| 2023/0004614 A1* | 1/2023 | Li | G06Q 30/0265 |

OTHER PUBLICATIONS

Search Report issued by the Chinese Patent Office for Chinese Patent Application No. 202110736043.6, dated Aug. 11, 2023.

* cited by examiner

METHOD AND APPARATUS FOR DISPLAYING MAP POINTS OF INTEREST, AND ELECTRONIC DEVICE

TECHNICAL FIELD

The present disclosure relates to the technical field of artificial intelligence, and in particular to intelligent transportation.

BACKGROUND

In order to facilitate a user to search for a place of interest to the user by using a map, at least one Point of Interest (POI) may be displayed in the map to indicate at least one position of the place that the user may be interested in. For example, the at least one point of interest used for indicating at least one position of popular destinations may be displayed in the map, so that the user can go to the popular destinations of interest according to the at least one point of interest.

SUMMARY

The present disclosure provides a method and apparatus for displaying Point of Interest (points of interest) in a map more accurately, an electronic device, and a non-transitory storage medium.

In an embodiment of the present disclosure, a method for displaying map points of interest is provided. The method may include the following operations.

Features corresponding to multiple candidate points of interest are acquired.

Predicted popularity of each of the multiple candidate points of interest is determined according to a mapping relation between each feature and each popularity and the features of the multiple candidate points of interest. The mapping relation is determined based on the frequency of operations performed by a user for each sample point of interest in a historical time period.

The candidate points of interest of which predicted popularity meets a preset popularity condition is displayed in a map.

In another embodiment of the present disclosure, an electronic device is provided. The electronic device may include:

at least one processor; and a memory, in communication connection with the at least one processor.

The memory is configured to store instructions capable of being performed by the at least one processor. The instructions are performed by the at least one processor to perform the method mentioned above.

In another embodiment of the present disclosure, a non-transitory storage medium storing computer instructions is provided. The computer instructions are used for performing, by a computer, the method mentioned above.

It is to be understood that, the content described in this section is not intended to identify the key or important features of the embodiments of the present disclosure, nor is it intended to limit the scope of the present disclosure. Other features of the present disclosure will become easy to understand through the following description.

BRIEF DESCRIPTION OF THE DRAWINGS

Drawings are used for better understanding the solution, and are not intended to limit the present disclosure.

DETAILED DESCRIPTION

Exemplary embodiments of the present disclosure are described in detail below with reference to the drawings, including various details of the embodiments of the present disclosure to facilitate understanding, and should be regarded as exemplary. Thus, those of ordinary skilled in the art shall understand that, variations and modifications can be made on the embodiments described herein, without departing from the scope and spirit of the present disclosure. Likewise, for clarity and conciseness, descriptions of well-known functions and structures are omitted in the following description.

In order to describe a method for displaying map points of interest provided by an embodiment of the present disclosure more clearly, a possible application scenario of the method for displaying map points of interest provided by this embodiment of the present disclosure will be exemplarily described below. It is to be understood that, an example below is the possible application scenario of the method for displaying map points of interest provided by this embodiment of the present disclosure. In other optional embodiments, the method for displaying map points of interest provided by the present disclosure may also be applicable to other possible application scenarios. The example below does not impose any limitations thereto.

There may be multiple places that a user may be interested in an area shown in a map. For example, assuming that the area shown in the map is an urban area of some city, a movie theater, a restaurant, a hotel, a museum, an airport, a train station, a shopping mall and the like in the urban areas may be the places of interest to the user. When all points of interest used for expressing these places are displayed in the map, there may be too many points of interest displayed in the map, causing the places that the user is actually interested in to be difficult to effectively find out. Therefore, points of interest are required to be selectively displayed.

In an implementation, relevant personnel, such as experts in the field of intelligent transportation, may set selecting rules based on experience, and select some points of interest from the points of interest for display according to the set selecting rules.

However, the experience of the relevant personnel is often limited. Thus, the selecting rules set by the relevant personnel are often applicable to certain application scenarios, and are difficult to apply to other application scenarios. In other words, in some application scenarios, positions indicated by the points of interest that are selected according to the selecting rules set by the relevant personnel are not the positions that the user is actually interested in. That is, the accuracy of the selected points of interest is relatively low.

Figure 1:
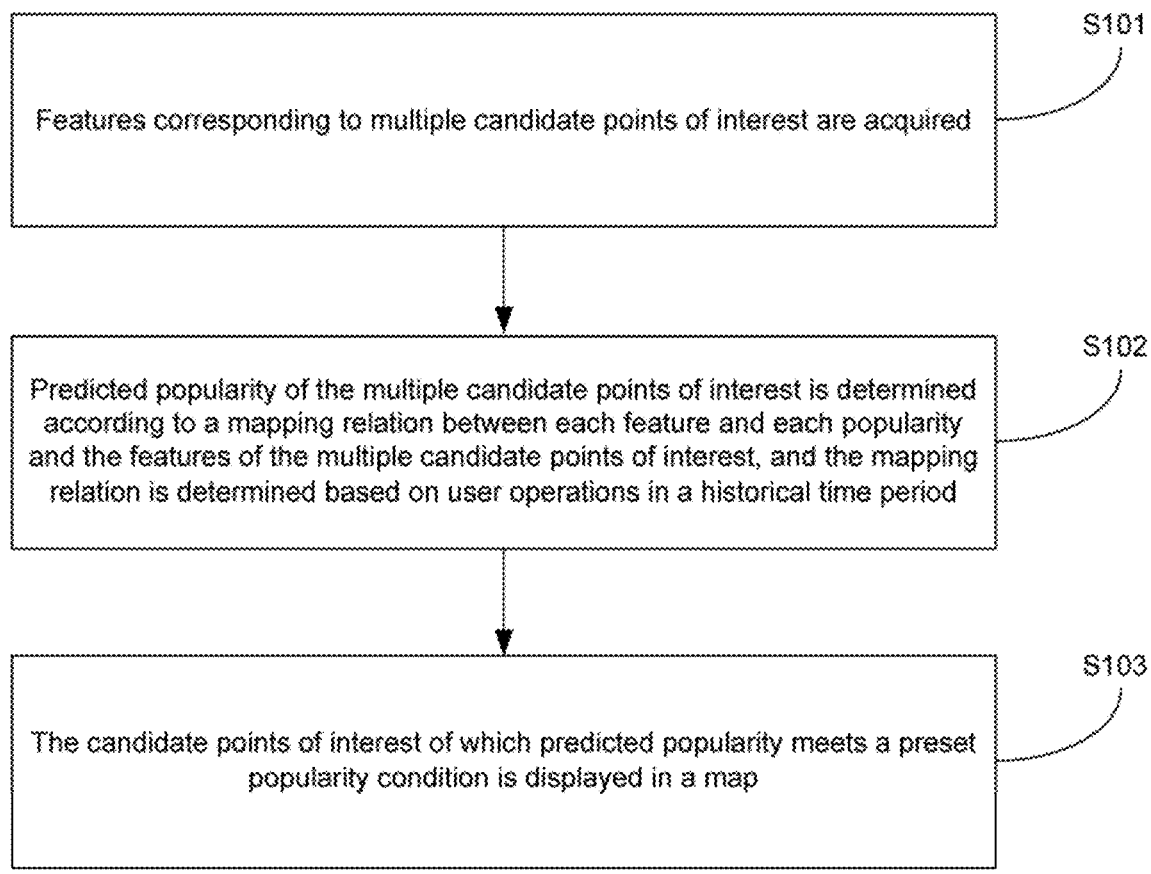
FIG. 1 is a schematic flowchart of a method for displaying map points of interest according to an embodiment of the present disclosure.

As shown in FIG. 1, FIG. 1 is a schematic flowchart of a method for displaying map points of interest according to an embodiment of the present disclosure. The method may include the following steps.

At step S101, features corresponding to multiple candidate points of interest are acquired.

At step S102, predicted popularity of the multiple candidate points of interest is determined according to a mapping relation between each feature and each popularity and the features of the multiple candidate points of interest, and the mapping relation is determined based on user operations in a historical time period.

At step S103, the candidate points of interest of which predicted popularity meets a preset popularity condition is displayed in a map.

Through this embodiment, according to the mapping relation between each feature and each popularity, the predicted popularity of the candidate points of interest is obtained by mapping the features of the candidate points of interest. Since the mapping relation is determined based on the frequency of operations performed by the user for each sample point of interest in the historical time period, and the user operations performed by the user are often targeted at objects of interest to the user, the frequency of the operations performed by the user on each sample point of interest in the historical time period can reflect, to a certain extent, the points of interest that the user is actually interested in. Thus, the predicted popularity determined according to the mapping relation can reflect the degree of interest of the user in each candidate point of interest. Therefore, when the predicted popularity of the candidate points of interest meets the preset popularity condition, it can be considered that the user has a certain degree of interest in the candidate points of interest. That is, the candidate points of interest are the points of interest that the user is interested in. In this way, by displaying the candidate points of interest of which predicted popularity meets the preset popularity condition in the map, the points of interest that the user is interested in can be relatively and accurately displayed in the map, so that the accuracy of the displayed points of interest can be enhanced.

The places expressed by the candidate points of interest in step S101 should be located in an area displayed in the map. Exemplarily, assuming that the area displayed in the map is an urban area of a city A, a point of interest expressing a train station of a city B is not the candidate points of interest. In addition, the places expressed by the candidate points of interest may include all places that the user may be interested in within the area displayed in the map, and may also include some places that the user may be interested in within the area displayed in the map. Exemplarily, assuming that the area displayed in the map is the urban area of the city A, and in the urban area A, the places that the user may be interested in include a train station, an airport, a cinema, and a hotel, the candidate points of interest may include the points of interest for expressing the train station, the airport, the cinema, and the hotel, and may also include the points of interest for expressing the train station and the airport, but does not include the points of interest for expressing the cinema and the hotel.

The features corresponding to the points of interest may be any features that characterize factors related to the points of interest, including but not limited to at least some of the following features: user-side features used for characterizing each user who uses the map, scene features used for characterizing the scene at which each user uses the map, and points of interest features used for characterizing the points of interest corresponding to the features. The user-side features, the scene features, and the points of interest features will be described in detail below, so that details are not described again herein. It is to be understood that, points of interest are used to be displayed to each user who uses the map, so that this user can find the places of interest based on the displayed points of interest. Therefore, each user who uses the map is a factor related to the points of interest, and the points of interest are displayed in the map. Thus, the scene at which each user uses the map is the scene at which the points of interest are displayed to this user. In this way, the scene is the factor related to the points of interest. In addition, the points of interest are obviously the factor related to the points of interest.

In step S102, the sample points of interest may be completely the same points of interest as the candidate points of interest, may also be partially the same points of interest as the candidate points of interest, and may further be points of interest completely different from the candidate points of interest. In addition, the quantity of the sample points of interest may be the same as or different from the quantity of the candidate points of interest. Exemplarily, assuming that the candidate points of interest are points of interest 1 to 4, the sample points of interest may be the points of interest 1 to 4, may also be the points of interest 3 to 7, and may further be the points of interest 5 to 10.

In addition, the user may include the user who is an executive subject of the method for displaying points of interest in the map provided in an embodiment of the present disclosure (hereinafter referred to as a target user), may not include the target user, and the quantity of the user may refer to one user or multiple users. The present disclosure does not impose any limitations thereto. The operations performed by the user for the points of interest include, but are not limited to: clicking the points of interest in the map, searching for the positions expressed by the points of interest, and so on.

It is to be understood that, the user often perform the operations on the points of interest. Therefore, it may be considered that the higher the frequency of the user operating on one point of interest, the more the user interested in this point of interest. Exemplarily, assuming that the user has searched for the sample point of interest "cinema" for ten times within the historical time period and searched for the sample points of interest "airport" for one time, it may be considered that the user is more interested in the sample point of interest "cinema" than the sample point of interest "airport".

In addition, a certain commonality often exists between the candidate points of interest and the sample points of interest. For example, assuming that the candidate points of interest include a cinema A and the sample points of interest include a cinema B, although the cinema A and the cinema B are two different cinemas, a certain commonality exists between the cinema A and the cinema B as both the cinema A and the cinema B are cinemas. For another example, the candidate points of interest include a popular destination and the sample points of interest include a popular restaurant, although the popular destination and the popular restaurant are different points of interest, both the popular destination and the popular restaurant have a commonality of high popularity. Since the candidate points of interest and the sample points of interest often have a certain commonality, the interest of the user in the sample points of interest can reflect the interest of the user in the candidate points of interest to a certain extent. That is, based on the mapping relation obtained by determining the frequency of the operations performed by the user for each sample point of interest within the historical time period, the predicted popularity of the multiple candidate points of interest may be determined.

Different predicted popularity may be expressed according to different application scenarios. Exemplarily, the predicted popularity of the candidate points of interest may be expressed in a manner of using a popularity value, and may also be expressed by using a relative comparison. Exemplarily, assuming that there are three candidate points of interest, which are respectively recorded as the candidate points of interest 1 to 3, the predicted popularity of the candidate points of interest 1 to 3 may be expressed as follows: the candidate point of interest 1 has a popularity value of 0.8, the candidate point of interest 2 has a popularity value of 0.5, and the candidate point of interest 3 has a popularity value of 0.9. The predicted popularity may also be expressed as follows: the predicted popularity of the candidate points of interest 3> the predicted popularity of the candidate points of interest 1> the predicted popularity of the candidate points of interest 2.

Moreover, in an optional embodiment, the relative comparison may also be expressed in the form of a sequence. For example, the relative comparison may be expressed by the sequence obtained by sorting the multiple candidate points of interest in a descending order of the predicted popularity. For example, the relationship that the predicted popularity of the candidate point of interest 3> the predicted popularity of the candidate point of interest 1> the predicted popularity of the candidate point of interest 2 may be expressed with the sequence {the candidate point of interest 3, the candidate point of interest 1, the candidate point of interest 2}.

The determination of the mapping relation will be described in detail below, and is not described again herein.

In step S103, the preset popularity condition may be different according to actual requirements and different expression forms of the predicted popularity. Exemplarily, when the predicted popularity is expressed in the form of the popularity value, the preset popularity condition may be that the popularity value is higher than a preset popularity threshold value. For example, by still taking the example in the foregoing S102 as an example, assuming that the preset popularity threshold value is 0.7, the candidate point of interest 1 and the candidate point of interest 3 may be displayed in the map. The preset popularity threshold value may be calculated based on the actual requirements of the user or according to a preset rule. For example, the user may set the preset popularity threshold value to 0.6 based on the actual requirements. Alternatively, a statistic value of the predicted popularity of the multiple candidate points of interest may be counted as the preset popularity threshold value. The statistic value may refer to any of numerical values obtained through statistics, such as arithmetic mean and median.

When the predicted popularity is expressed in the form of the relative comparison, or when the predicted popularity is expressed in the form of the popularity value, the preset popularity condition may also be the candidate points of interest that are located before a preset order when being sorted according to the predicted popularity in the descending order. For example, by still taking the example in the foregoing S102 as an example, assuming that the preset order is the second place, since when the predicted popularity is sorted in the descending order, the candidate point of interest 1 and the candidate point of interest 3 are located in the top 2 positions, the candidate point of interest 2 is located at the third position, so that the candidate points of interest 1 and the candidate points of interest 3 may be displayed in the map.

Figure 2:
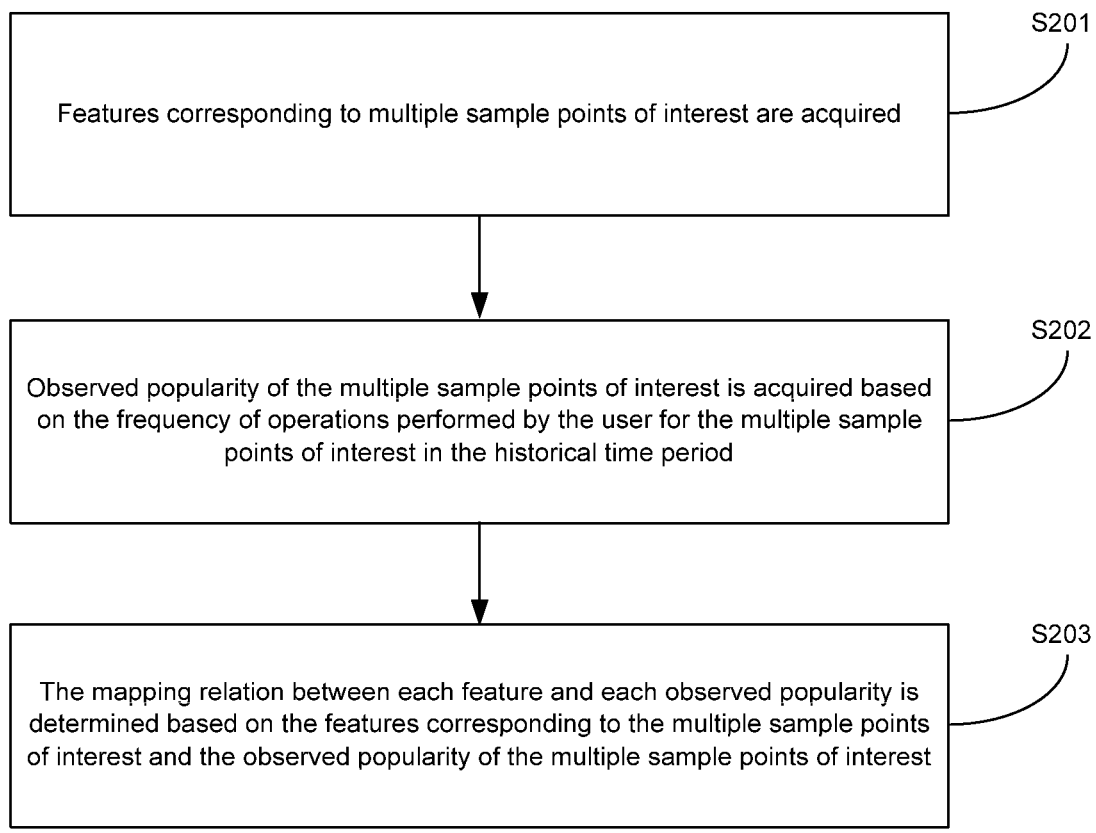
FIG. 2 is a schematic flowchart of a method for determining a mapping relation according to an embodiment of the present disclosure.

The determination of the mapping relation is described below. As shown in FIG. 2, FIG. 2 is a schematic flowchart of a method for determining a mapping relation according to an embodiment of the present disclosure. The method may include the following steps.

At step S201, features corresponding to multiple sample points of interest are acquired.

A feature type corresponding to the sample points of interest should be the same as a feature type corresponding to the candidate points of interest. Exemplarily, when features corresponding to the candidate points of interest include the user-side features, features corresponding to the sample points of interest should also include the user-side features. In addition, when the features corresponding to the candidate points of interest do not include the user-side features, the features corresponding to the sample points of interest should also not include the user-side features.

At step S202, observed popularity of the multiple sample points of interest is acquired based on the frequency of operations performed by the user for the multiple sample points of interest in the historical time period.

The frequency based on which the mapping relation is determined may be the frequency that the user actually performs the operations on each sample point of interest within the historical time period, and may refer to the frequency that the user expects to perform the operations on each sample point of interest within the historical time period. The frequency may be expressed either in the form of a numerical value, or in the form of the relative comparison.

Exemplarily, assuming that there are three sample points of interest, which are respectively recorded as the sample points of interest 1 to 3, in an optional embodiment, it may be the number of times that the user performs the operations on each sample points of interest within the historical time period. Assuming that within the historical time period, the user searches the sample point of interest 1 for five times, searches the sample point of interest 2 for three times, and searches the sample point of interest 3 for two times, the frequency of the operations performed by the user on the sample points of interest may be expressed as: the frequency of the operations performed on the sample point of interest 1 is 0.5, the frequency of the operations performed on the sample point of interest 2 is 0.3, and the frequency of the operations performed on the sample point of interest 3 is 0.2. The frequency of the operations performed by the user on the sample points of interest may also be expressed as: the frequency of the operations performed on the sample point of interest 1> the frequency of the operations performed on the sample point of interest 2> the frequency of the operations performed on the sample point of interest 3. In addition, the relative comparison may also be expressed in the form of the sequence. For example, the sequence {the sample point of interest 1, the sample point of interest 2, the sample point of interest 3} may be used for expressing the relationship of the frequency of the operations performed on the sample point of interest 1> the frequency of the operations performed on the sample point of interest 2> the frequency of the operations performed on the sample point of interest 3.

In another optional embodiment, it may also be the frequency that a sample user expects to perform the operations on each point of interest within the historical time period based on self-experience. Exemplarily, assuming that the sample user thinks that this sample user has the most interest in the sample point of interest 1 according to self-experience, has an average interest in the sample point of interest 2, and has the least interest in the sample point of interest 3, the sample user annotates the sequence {the sample point of interest 1, the sample point of interest 2, the sample point of interest 3} according the self-experience. In other optional embodiments, the frequency annotated by the sample user may also be expressed in other forms other than the sequence. The other forms of frequency expression may refer to the relevant description in the preceding text, which will not be repeated herein.

In addition, the observed popularity of the sample points of interest may be the frequency of the operations performed by the user on the sample points of interest within the historical period of time, and may also be calculated based on the frequency. Exemplarily, in an optional embodiment, the frequency of operations performed by the user for the multiple sample points of interest in the historical time period may be taken as the observed popularity of the sample points of interest. Exemplarily, by taking the foregoing example as an example, assuming that the frequency annotated by the user is expressed in the form of the sequence {the sample point of interest 1, the sample point of interest 2, the sample point of interest 3}, the sequence may be taken as the sequence for expressing the observed popularity of the sample points of interest.

In another optional embodiment, the multiple sample points of interest are sorted based on the frequency, so as to obtain a sample point of interest sequence for expressing the observed popularity of the multiple sample points of interest. Exemplarily, assuming that there are three sample points of interest, which are respectively recorded as the sample points of interest 1 to 3, and further assuming that the frequency of the operations performed on the sample point of interest 1 is 0.5, the frequency of the operations performed on the sample point of interest 2 is 0.3, and the frequency of the operations performed on the sample point of interest 3 is 0.2, a sample point of interest sequence {the sample point of interest 1, the sample point of interest 2, the sample point of interest 3} may be obtained by sorting the multiple sample points of interest according to the descending frequency order (in other embodiments, it may also be in other order, for example, an ascending order). The sample point of interest sequence may be used for expressing a relationship of the observed popularity of the sample point of interest 1> the observed popularity of the sample point of interest 2> the observed popularity of the sample point of interest 3.

It is to be understood that, in order to accurately determine the mapping relation between each feature and each popularity, it often needs to be based on the features and observed popularity of a large number of sample points of interest. When the observed popularity of each sample point of interest is obtained in a manner of manual annotation, a high manual cost of the determined mapping relation may be caused. Through this embodiment, based on the frequency of the operations performed by the user on the sample points of interest within the historical time period, the sample point of interest sequence used for expressing the observed popularity of each sample point of interest can be calculated, without manually annotating by the user. Therefore, the manual cost required for the determination of the mapping relation can be effectively reduced.

At step S203, the mapping relation between each feature and each observed popularity is determined based on the features corresponding to the multiple sample points of interest and the observed popularity of the multiple sample points of interest.

The expression of the mapping relation may also be expressed in different forms according to different application scenarios. For example, it may be expressed in the form of a function, may also be expressed in the form of a neural network model, and may further be expressed in the form of other algorithm models other than the neural network model.

Exemplarily, in an optional embodiment, the mapping relation may be expressed in the form of a sorting model. In this embodiment, the sorting model for expressing the mapping relation between each feature and each observed popularity is obtained through training based on the features corresponding to the multiple sample points of interest, the sample point of interest sequence, and a preset sorting learning algorithm. In this example, the trained sorting model is the mapping relation between each feature and each popularity. Through this embodiment, the sorting learning algorithm may be utilized to enhance the accuracy of the determined mapping relation.

The preset sorting learning algorithm may be different sorting learning algorithms according to actual requirements, including but not limited to a PointWise Approach, a PairWise Approach, a ListWise Approach, and the like.

Through the embodiment shown in FIG. 2, based on the frequency of the operations performed by the user on the multiple sample points of interest within the historical time period, the observed popularity of each sample point of interest may be determined, so that the mapping relation between each feature and each popularity based on the features of the sample points of interest and the observed popularity of each sample point of interest. That is, the accuracy of the determined mapping relation can be enhanced through this embodiment.

The user-side features, the scene features, and the point of interest features will be separately described below.

The user-side features include, but are not limited to, at least some of the features of ages, genders, education levels, interests, whether the user owns a vehicle, residential addresses, office locations, and whether the user is in a different place. A remote location may mean that a city where the user is located is different from a city where the user lives, and may also mean that a city currently displayed in the map is different from the city where the user lives.

It is to be understood that, users with different user-side features may be interested in different points of interest. For example, young people may be interested in movie theaters and amusement parks, but not in tea houses and bird and flower markets. The elderly may be interested in the teahouses and the bird and flower markets, but not in the movie theaters and the amusement parks. For another example, the users who own vehicles may be interested in car wash shops and car sales service 4s (Sale Sparepart Service Survey) shops, while the users who do not own vehicles may not be interested in the car wash shops and the car sales service 4s shops.

The scene features include, but are not limited to, at least some features in scale dimensions, operation sequence contexts of the users, and weathers. The scale dimensions are used for characterizing the scale of the map used by the user. For example, the scale dimensions may be used for characterizing the scale of the map used by the user as 1:1000, 1:500, 1:100, and so on. The operation sequence contexts of the users are used for characterizing a contextual relationship between the user operations performed by the user. Exemplarily, it may be used for characterizing the following user operations successively performed by the user. A keyword "metro line 1" is searched, and then the map is dragged. The weathers may refer to the weather when the user uses the map, such as sunny, light rain, heavy snow, etc.

It is to be understood that, in scenes with different scene features, the user may be interested in different points of interest. For example, an area displayed in the map is relatively small when the scale is 1:100, and the points of interest that occupy a larger area may not be fully displayed in the map. The area displayed in the map is relatively large when the scale is 1:1000, so that the points of interest that occupy a small area is hard to relatively and accurately display in the map. In this way, when the user adjusts the scale of the map to be 1:100, the user is often interested in the points of interest that occupy a small area, such as a restaurant and a convenience store. When the user adjusts the scale of the map to be 1:1000, the user is often interested in the points of interest that occupy a large area, such as a train station and a museum.

For another example, when the operation sequence contexts of the users are used for characterizing the following user operations successively performed by the user. The keyword "metro line 1" is searched, and then the map is dragged. After that, it may be considered that the user is observing areas along the metro line 1 by dragging the map. Therefore, it may be considered that the user is interested in the points of interest along the metro line 1. When the operation sequence contexts of the users are used for characterizing the following user operations successively performed by the user: the keyword "metro line 1" is searched, and then the map is enlarged, after that it may be considered that the user is determining a specific position of an entrance of the metro line 1 by enlarging the map. In this case, it may be considered that the user is interested in the entrance of the metro line 1.

For another example, when it is sunny, the user may be interested in outdoor points of interest, such as a park and an outdoor basketball court. When it rained heavily, the user may be interested in indoor points of interest, such as a library and an indoor basketball court.

The points of interest features include, but are not limited to, at least some features of the size of the points of interest, search popularity, click popularity, whether a point of interest faces a street, and a distance between each point of interest and a target position.

The size of each point of interest may be used for either characterizing the floor area of this point of interest, or characterizing the building area of this point of interest. It is to be understood that, in some scenes, the user may be interested in a point of interest with a large floor area, while in other scenes, the user may be interested in the a point of interest with a small floor area. Exemplarily, the related examples of the foregoing scale dimensions may be referred to. Therefore, the size of the each point of interest can be used as a criterion for whether the user is interested in this point of interest.

The search popularity may be used for characterizing the frequency of the points of interest being retrieved. Exemplarily, assuming that within a same time window, each user has retrieved the point of interest A for a total of 100,000 times and the point of interest B for a total of 110,000 times, it can be considered that the point of interest B has the higher search popularity than the point of interest A. It is to be understood that, the points of interest retrieved by the user may be considered as the points of interest that the user is interested in. Therefore, when the search popularity of one point of interest is higher, it can be considered that the more users are interested in this point of interest, so that the more likely the user is to be interested in this point of interest. That is, the search popularity can be used as a criterion for whether the user is interested in each point of interest.

The click popularity may be used for characterizing the frequency of the points of interest being clicked. Exemplarily, assuming that within the same time window, each user has clicked the point of interest A for a total of 120,000 times and the point of interest B for a total of 100,000 times, it can be considered that the point of interest A has the higher click popularity than the points of interest B. It is to be understood that, the points of interest clicked by the user may be considered as the points of interest that the user is interested in. Therefore, when the search popularity of one point of interest is higher, it can be considered that the more users are interested in this point of interest, so that the more likely the user is to be interested in this point of interest. That is, the click popularity can be used as a criterion for whether the user is interested in this point of interest.

The point of interest faces a street is used for characterizing that this point of interest is adjacent to the street. It is to be understood that, the point of interest adjacent to the street have relatively convenient traffic, while the point of interest that is not adjacent to the street may have a relatively quiet environment due to a low pedestrian flow. In some scenes, the user may be more interested in the point of interest with the convenient traffic. In some other scenes, the user may be interested in the point of interest in a quiet environment. Exemplarily, when the user searches for a restaurant, the user may require the restaurant with convenient transportation. Therefore, the user may be more interested in the restaurant facing the street. When the user searches for a bookstore, the user may require a bookstore with the quiet environment, so that the user may be more interested in the bookstore that does not face the street. Thus, whether the point of interest faces a street may be used as a criterion for whether the user is interested in this point of interest.

The target position may refer to a position at which the user is located, may also be a destination of a trip of the user, and may further refer to any position specified by the user. The distance between the point of interest and the target position may refer to a linear distance between the position at which the point of interest is located and the target position, and may also refer to a path distance of any path between the position at which the point of interest is located and the target position. It is to be understood that, in some scenes, the user may be interested in the point of interest that is closer to the target position, while in other scenes, the user may be interested in the point of interest that is far away from the target position. Exemplarily, by taking the target position as the position at which the user is located as an example, the user may be more interested in the point of interest that are closer to the target position in order to reduce the time cost of arriving at the point of interest. The user may also be more interested in the point of interest that is far away from the target position due to the desire to improve moods by going on a long journey. Therefore, the distance of the point of interest from the target position may be used as a criterion for whether the user is interested in this point of interest.

It may be learned from the above analysis that, the user-side features, the scene features, and the points of interest features can all reflect, to a certain extent, whether the user is interested in the points of interest. Therefore, when the features include at least some of the user-side features, the scene features, and the points of interest features, logical relevance between each feature and each popularity is stronger, so that the robustness of the determined mapping relation can be better.

Figure 3:
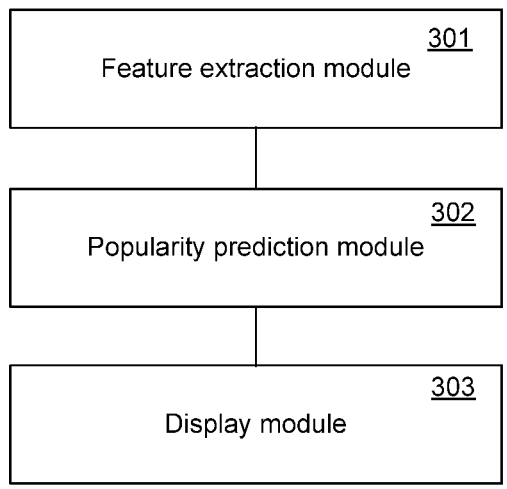
FIG. 3 is a schematic structural diagram of an apparatus for displaying map points of interest according to an embodiment of the present disclosure.

As shown in FIG. 3, FIG. 3 is a schematic structural diagram of an apparatus for displaying map points of interest according an embodiment of to the present disclosure. The apparatus may include a feature extraction module 301, a popularity prediction module 302 and a display module 303.

The feature extraction module 301 is configured to acquire features corresponding to multiple candidate points of interest.

The popularity prediction module 302 is configured to determine predicted popularity of each of the multiple candidate points of interest according to a mapping relation between each feature and each popularity and the features of the multiple candidate points of interest. The mapping relation is determined based on the frequency of operations performed by a user for each sample points of interest in a historical time period.

The display module 303 is configured to display the candidate points of interest of which predicted popularity meets a preset popularity condition in a map.

In an optional embodiment, the device further includes a model training module. The model training module is configured to determine the mapping relation by using the following method, and the method includes the following operations.

Features corresponding to multiple sample points of interest are acquired.

Observed popularity of each of the multiple sample points of interest is acquired based on the frequency of operations performed by the user for the multiple sample points of interest in the historical time period.

A mapping relation between each feature and each observed popularity is determined based on the features corresponding to the multiple sample points of interest and the observed popularity of each of the multiple sample points of interest.

In an optional embodiment, the operation of acquiring the observed popularity of each of the multiple sample points of interest based on the frequency of operations performed by the user for the multiple sample points of interest in the historical time period includes the following steps.

For each of the multiple sample points of interest, the frequency of user operations for this sample point of interest in the user operations within the historical time period is determined.

The multiple sample points of interest is sorted based on the frequency, to obtain a sample point of interest sequence for expressing the observed popularity of each of the multiple sample points of interest.

In an optional embodiment, the operation that the model training module determines the mapping relation between each feature and each observed popularity based on the features corresponding to the multiple sample points of interest and the observed popularity of each of the multiple sample points of interest includes the following steps.

A sorting model for expressing the mapping relation between each feature and each observed popularity is obtained through training based on the features corresponding to the multiple sample points of interest, the sample point of interest sequence, and a preset sorting learning algorithm.

In an optional embodiment, the features include at least some of user-side features, scene features, and point of interest features, the user-side features are used for characterizing each user using a map, the scene features are used for characterizing scenes at which each user uses the map, and the point of interest features are used for characterizing the points of interest corresponding to the features.

In the technical solution of the present disclosure, the involved acquisition, storage, and application of personal information of a user are in compliance with relevant laws and regulations, and do not violate public order and good customs.

According to an embodiment of the present disclosure, the present disclosure further provides an electronic device, a non-transitory storage medium, and a computer program product.

Figure 4:
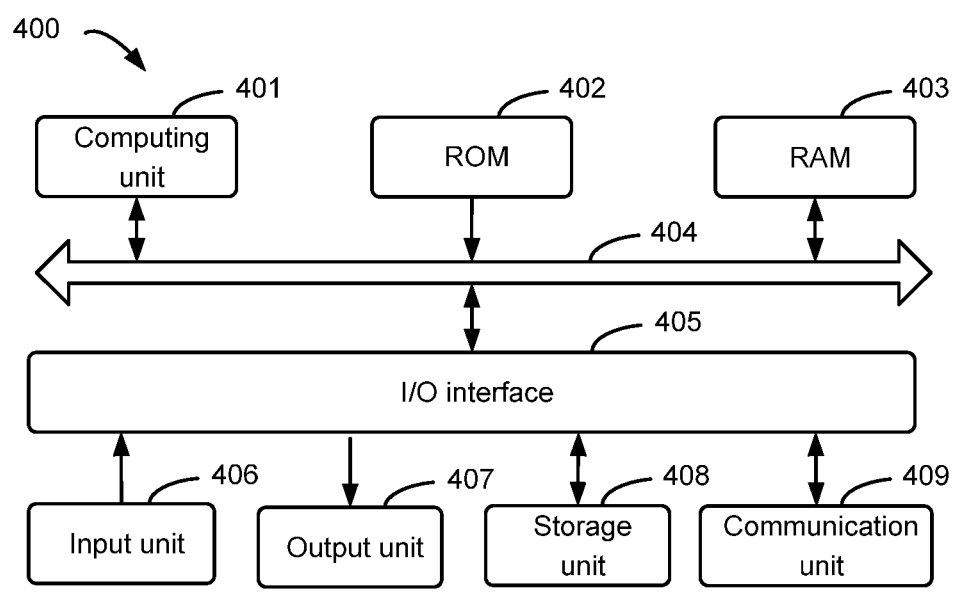
FIG. 4 is a block diagram of an electronic device configured to implement the method for displaying map points of interest according to an embodiment of the present disclosure.

FIG. 4 is a schematic block diagram of an example electronic device 400 configured to implement an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also express various forms of mobile devices, such as personal digital processing, cellular phones, smart phones, wearable devices, and other similar computing devices. The components shown herein, connections and relationships of the components, and functions of the components are merely examples, and are not intended to limit the implementation of the present disclosure described and/or required herein.

As shown in FIG. 4, the device 400 includes a computing unit 401. The computing unit may perform various appropriate actions and processing operations according to a computer program stored in a Read-Only Memory (ROM) 402 or a computer program loaded from a storage unit 408 into a Random Access Memory (RAM) 403. In the RAM 403, various programs and data required for the operation of the device 400 may also be stored. The computing unit 401, the ROM 402, and the RAM 403 are connected with each other by using a bus 404. An Input/Output (I/O) interface 405 is also connected with the bus 404.

Multiple components in the device 400 are connected with the I/O interface 405, and include: an input unit 406, such as a keyboard and a mouse; an output unit 407, such as various types of displays and loudspeakers; the storage unit 408, such as a disk and an optical disc; and a communication unit 409, such as a network card, a modem, and a wireless communication transceiver. The communication unit 409 allows the device 400 to exchange information/data with other devices through a computer network, such as the Internet, and/or various telecommunication networks.

The computing unit 401 may be various general and/or special processing assemblies with processing and computing capabilities. Some examples of computing unit 401 include, but are not limited to, a Central Processing Unit (CPU), a Graphics Processing Unit (GPU), various dedicated Artificial Intelligence (AI) computing chips, various computing units for running machine learning model algorithms, a Digital Signal Processor (DSP), and any appropriate processors, controllers, microcontrollers, etc. The computing unit 401 performs the various methods and processing operations described above, for example, the method for displaying map points of interest. For example, in some embodiments, the method for displaying map points of interest may be implemented as a computer software program, which is tangibly included in a machine-readable medium, such as the storage unit 408. In some embodiments, part or all of the computer programs may be loaded and/or installed on the device 400 via the ROM 402 and/or the communication unit 409. When the computer program is loaded into the RAM 403 and performed by the computing unit 401, at least one step of the method for displaying map points of interest described above may be performed. Alternatively, in other embodiments, the computing unit 401 may be configured to perform the method for displaying map points of interest in any other suitable manners (for example, by means of firmware).

The various implementations of systems and technologies described herein may be implemented in a digital electronic circuit system, an integrated circuit system, a Field Programmable Gate Array (FPGA), an Application-Specific Integrated Circuit (ASIC), an Application-Specific Standard Product (ASSP), a System-On-Chip (SOC), a Complex Programmable Logic Device (CPLD), computer hardware, firmware, software, and/or a combination thereof. These various implementations may include: being implemented in at least one computer program, the at least one computer program may be performed and/or interpreted on a programmable system including at least one programmable processor. The programmable processor may be a dedicated or general programmable processor, which can receive data and instructions from a storage system, at least one input device, and at least one output device, and transmit the data and instructions to the storage system, the at least one input device, and the at least one output device.

Program codes used for implementing the method of the present disclosure can be written in any combination of at least one programming language. These program codes can be provided to the processors or controllers of general computers, special computers, or other programmable data processing devices, so that, when the program codes are performed by the processors or controllers, functions/operations specified in the flowcharts and/or block diagrams are implemented. The program codes can be performed entirely on a machine, partially performed on the machine, and partially performed on the machine and partially performed on a remote machine as an independent software package, or entirely performed on the remote machine or a server.

In the context of the present disclosure, a machine-readable medium may be a tangible medium, which may include or store a program for being used by an instruction execution system, device, or apparatus or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, device, or apparatus, or any foregoing suitable combinations. More specific examples of the machine-readable storage medium may include electrical connections based on at least one wire, a portable computer disk, a hard disk, a RAM, a ROM, an Erasable Programmable Read-Only Memory (EPROM or flash memory), an optical fiber, a portable Compact Disk Read-Only Memory (CD-ROM), an optical storage device, a magnetic storage device, or any above suitable combinations.

In order to provide interaction with a user, the system and technologies described herein can be implemented on a computer, including a display device for displaying information to the user (for example, a Cathode Ray Tube (CRT) or a Liquid Crystal Display (LCD) monitor), a keyboard and a pointing device (for example, a mouse or a trackball). The user can provide an input to the computer by using the keyboard and the pointing device. Other types of devices may also be configured to provide interaction with the user, for example, the feedback provided to the user may be any form of sensory feedback (such as visual feedback, auditory feedback, or tactile feedback), and may be the input from the user received in any form (including acoustic input, voice input, or tactile input).

The system and technologies described herein may be implemented in a computing system (for example, as a data server) including a back-end component, or a computing system (for example, an application server) including a middleware component, or a computing system (for example, a user computer with a graphical user interface or network browser, the user may be in interaction with implementations of the system and technologies described herein by using the graphical user interface or network browser) including a front-end component, or a computing system including any combination of the back-end component, the middleware component, or the front-end component. The components of the system can be connected to each other through any form or digital data communication (for example, a communication network) of the medium. Examples of the communication network include a Local Area Network (LAN), a Wide Area Network (WAN), and the Internet.

The computer system may include a client and a server. The client and the server are generally far away from each other and usually interact by means of the communication network. A relationship between the client and the server is generated by the computer program that is run on the corresponding computer and has a client-server relationship with each other. The server may be a cloud server, and may also be a distributed system server, or a server combined with a blockchain.

It is to be understood that, the steps may be reordered, added or deleted by using various forms of programs shown above. For example, the steps described in the present disclosure may be performed parallelly, sequentially, or in a different order, as long as desired results of the technical solutions disclosed in the present disclosure can be achieved, which are not limited herein.

The foregoing specific implementations do not constitute limitations on the protection scope of the present disclosure. Those skilled in the art should understand that, various modifications, combinations, sub-combinations and substitutions can be made according to design requirements and other factors. Any modifications, equivalent replacements, improvements and the like made within the spirit and principle of the present disclosure shall fall within the scope of protection of the present disclosure.

What is claimed is:

1. A method for displaying map points of interest, the method comprising:
    acquiring features corresponding to a plurality of candidate points of interest;
    determining predicted popularity of each of the plurality of candidate points of interest according to a mapping relation between each feature and each popularity and the features of the plurality of candidate points of interest, wherein the mapping relation is determined based on the frequency of operations performed by a user for each sample point of interest in a historical time period; and
    displaying the candidate points of interest of which predicted popularity meets a preset popularity condition in a map;
    wherein the mapping relation is determined in advance by using the following method, the method comprising:
    acquiring features corresponding to a plurality of sample points of interest; obtaining observed popularity of each of the plurality of sample points of interest based on the frequency of operations performed by the user for the plurality of sample points of interest in the historical time period; and determining a mapping relation between each feature and each observed popularity based on the features corresponding to the plurality of sample points of interest and the observed popularity of each of the plurality of sample points of interest.

2. The method as claimed in claim 1, wherein obtaining the observed popularity of each of the plurality of sample points of interest based on the frequency of operations performed by the user for the plurality of sample points of interest in the historical time period comprises:
for each of the plurality of sample points of interest, determining the frequency of user operations for this sample point of interest in the user operations within the historical time period; and
sorting the plurality of sample points of interest based on the frequency to obtain a sample point of interest sequence for expressing the observed popularity of each of the plurality of sample points of interest.

3. The method as claimed in claim 1, wherein determining the mapping relation between each feature and each observed popularity based on the features corresponding to the plurality of sample points of interest and the observed popularity of each of the plurality of sample points of interest comprises:
performing training to obtain a sorting model for expressing the mapping relation between each feature and each observed popularity based on the features corresponding to the plurality of sample points of interest, the sample point of interest sequence, and a preset sorting learning algorithm.

4. The method as claimed in claim 1, wherein the features comprise at least some of user-side features, scene features, and point of interest features, the user-side features are used for characterizing each user using a map, the scene features are used for characterizing scenes at which each user uses the map, and the point of interest features are used for characterizing the points of interest corresponding to the features.

5. The method as claimed in claim 2, wherein determining the mapping relation between each feature and each observed popularity based on the features corresponding to the plurality of sample points of interest and the observed popularity of each of the plurality of sample points of interest comprises:
performing training to obtain a sorting model for expressing the mapping relation between each feature and each observed popularity based on the features corresponding to the plurality of sample points of interest, the sample point of interest sequence, and a preset sorting learning algorithm.

6. The method as claimed in claim 1, wherein places expressed by the candidate points of interest are located in an area displayed in the map.

7. The method as claimed in claim 1, wherein the predicted popularity of the candidate points of interest is expressed in a manner of using a popularity value, or the predicted popularity of the candidate points of interest is expressed by using a relative comparison.

8. The method as claimed in claim 1, wherein a feature type corresponding to the sample points of interest is the same as a feature type corresponding to the candidate points of interest.

9. The method as claimed in claim 1, wherein the frequency is expressed in the form of a numerical value, or the frequency is expressed in the form of the relative comparison.

10. An electronic device, comprising:
at least one processor, and
a memory, in communication connection with the at least one processor, wherein
the memory is configured to store instructions capable of being performed by the at least one processor, and the instructions are performed by the at least one processor to perform the following steps:
acquiring features corresponding to a plurality of candidate points of interest;
determining predicted popularity of each of the plurality of candidate points of interest according to a mapping relation between each feature and each popularity and the features of the plurality of candidate points of interest, wherein the mapping relation is determined based on the frequency of operations performed by a user for each sample point of interest in a historical time period; and
displaying the candidate points of interest of which predicted popularity meets a preset popularity condition in a map;
wherein the mapping relation is determined in advance by using the following method, the method comprising:
acquiring features corresponding to a plurality of sample points of interest obtaining observed popularity of each of the plurality of sample points of interest based on the frequency of operations performed by the user for the plurality of sample points of interest in the historical time period; and determining a mapping relation between each feature and each observed popularity based on the features corresponding to the plurality of sample points of interest and the observed popularity of each of the plurality of sample points of interest.

11. The electronic device as claimed in claim 10, wherein obtaining the observed popularity of each of the plurality of sample points of interest based on the frequency of operations performed by the user for the plurality of sample points of interest in the historical time period comprises:
for each of the plurality of sample points of interest, determining the frequency of user operations for this sample point of interest in the user operations within the historical time period; and
sorting the plurality of sample points of interest based on the frequency to obtain a sample point of interest sequence for expressing the observed popularity of each of the plurality of sample points of interest.

12. The electronic device as claimed in claim 10, wherein determining the mapping relation between each feature and each observed popularity based on the features corresponding to the plurality of sample points of interest and the observed popularity of each of the plurality of sample points of interest comprises:
performing training to obtain a sorting model for expressing the mapping relation between each feature and each observed popularity based on the features corresponding to the plurality of sample points of interest, the sample point of interest sequence, and a preset sorting learning algorithm.

13. The electronic device as claimed in claim 10, wherein the features comprise at least some of user-side features, scene features, and point of interest features, the user-side features are used for characterizing each user using a map, the scene features are used for characterizing scenes at which each user uses the map, and the point of interest features are used for characterizing the points of interest corresponding to the features.

14. A non-transitory storage medium, storing computer instructions, wherein the computer instructions are used for performing, by a computer, the following steps:
    acquiring features corresponding to a plurality of candidate points of interest;
    determining predicted popularity of each of the plurality of candidate points of interest according to a mapping relation between each feature and each popularity and the features of the plurality of candidate points of interest, wherein the mapping relation is determined based on the frequency of operations performed by a user for each sample point of interest in a historical time period; and
    displaying the candidate points of interest of which predicted popularity meets a preset popularity condition in a map;
    wherein the mapping relation is determined in advance by using the following method, the method comprising:
    acquiring features corresponding to a plurality of sample points of interest obtaining observed popularity of each of the plurality of sample points of interest based on the frequency of operations performed by the user for the plurality of sample points of interest in the historical time period; and determining a mapping relation between each feature and each observed popularity based on the features corresponding to the plurality of sample points of interest and the observed popularity of each of the plurality of sample points of interest.

15. The non-transitory storage medium as claimed in claim 14, wherein obtaining the observed popularity of each of the plurality of sample points of interest based on the frequency of operations performed by the user for the plurality of sample points of interest in the historical time period comprises:
    for each of the plurality of sample points of interest, determining the frequency of user operations for this sample point of interest in the user operations within the historical time period; and
    sorting the plurality of sample points of interest based on the frequency to obtain a sample point of interest sequence for expressing the observed popularity of each of the plurality of sample points of interest.

16. The non-transitory storage medium as claimed in claim 14, wherein determining the mapping relation between each feature and each observed popularity based on the features corresponding to the plurality of sample points of interest and the observed popularity of each of the plurality of sample points of interest comprises:
    performing training to obtain a sorting model for expressing the mapping relation between each feature and each observed popularity based on the features corresponding to the plurality of sample points of interest, the sample point of interest sequence, and a preset sorting learning algorithm.

17. The non-transitory storage medium as claimed in claim 14, wherein the features comprise at least some of user-side features, scene features, and point of interest features, the user-side features are used for characterizing each user using a map, the scene features are used for characterizing scenes at which each user uses the map, and the point of interest features are used for characterizing the points of interest corresponding to the features.

* * * * *